United States Patent [19]
Cheng et al.

[11] Patent Number: 5,483,515
[45] Date of Patent: Jan. 9, 1996

[54] APPARATUS AND METHOD FOR CANCELLING CROSS-TALK IN SIGNALS FROM OPTICAL DATA STORAGE SYSTEMS

[75] Inventors: David C. Cheng, Palo Alto; Jerry E. Hurst, Jr., San Jose; Radley W. Olson, Cupertino; David A. Thompson, San Jose, all of Calif.

[73] Assignee: International Business Machines Corporation, Armonk, N.Y.

[21] Appl. No.: 308,023

[22] Filed: Sep. 16, 1994

[51] Int. Cl.⁶ .................................................. G11B 7/00
[52] U.S. Cl. ..................... 369/124; 369/32; 369/44.34; 369/44.37; 369/48; 360/65; 358/328
[58] Field of Search ......................... 369/32, 44.26, 369/44.34, 44.37, 48, 49, 56, 109, 124; 360/65, 45; 358/328, 342

[56] References Cited

U.S. PATENT DOCUMENTS

| | | | |
|---|---|---|---|
| 3,491,351 | 1/1970 | Smaller et al. | 340/174.1 |
| 3,824,623 | 7/1974 | Gucker | 340/174.1 |
| 4,425,636 | 1/1984 | Musha et al. | 369/44.37 |
| 4,504,939 | 3/1985 | Eberly | 369/44.37 |
| 4,581,728 | 4/1986 | Nakamura et al. | 369/44.37 |
| 4,633,455 | 12/1986 | Hudson | 369/44.37 |
| 4,660,191 | 4/1987 | Maeda et al. | 369/44.37 |
| 4,720,825 | 1/1988 | Kokado | 369/44.37 |
| 4,831,613 | 5/1989 | Kanda | 369/109 |
| 5,020,044 | 5/1991 | Shimonou | 369/48 |
| 5,166,914 | 11/1992 | Shimada et al. | 369/32 |
| 5,181,161 | 1/1993 | Hirose et al. | 369/48 |

OTHER PUBLICATIONS

L. C. Barbosa, "Simultaneous Detection of Readback Signals from Interfering Magnetic Recording Tracks Using Array Heads", *IEEE Transactions on Magnetics*, vol. 26, No. 5, pp. 2163–2165, Sep., 1990.
L. C. Barbosa et al., "Estimation of Tracking Errors Using Array Heads", 1992 IEEE, pp. 950–955.
Optical Data Storage; SPIE vol. 1316 pp. 34–39, 1990.

*Primary Examiner*—Loha Ben
*Attorney, Agent, or Firm*—Baker, Maxham, Jester & Meador

[57] ABSTRACT

A system is disclosed for canceling cross-talk in a data read signal from an optical data storage medium. The system includes three AD converters for receiving read signals from three read sensors, and the read signals respectively represent data from a center data track and its two adjacent side data tracks on an optical data storage disk. The digitized signals are sent to a skew compensator to remove time skew between the signals. Then, the amplitudes represented by the side track signals are adjusted, and the adjusted side track signals are subtracted from the center track signal to cancel cross-talk in the center track signal which is attributable to data contained in the side data tracks. The center track signal is then equalized to account for the frequency response of the center track read sensor.

23 Claims, 3 Drawing Sheets

APPARATUS AND METHOD FOR CANCELLING CROSS-TALK IN SIGNALS FROM OPTICAL DATA STORAGE SYSTEMS

BACKGROUND OF THE INVENTION

1. Field of the Invention

The present invention relates generally to optical data storage systems, and more particularly to methods and apparatus for processing data signals from optical storage media.

2. Description of the Related Art

Electronic data storage media are ubiquitous in technologies that use computers. Commonly, data storage media are configured as data storage disks, and data is stored on the disks in closely spaced, substantially concentric circular or spiralled data tracks. More particularly, data is stored on a disk by rapidly rotating the disk under a data storage head, and the data storage head magnetically or optically alters characteristics of material on the disk surface along one or more tracks such that the altered areas of the disk surface represent the data to be stored. Then, to retrieve the data from the disk, the disk is rotated under a data read head. As the data tracks pass underneath the read head, the read head detects the alterations in the disk surface and, consequently, "reads" the stored data for output of the data. A read head may be associated with more than one read sensor to simultaneously read data on a plurality of tracks.

It may readily be understood that the data storage capacity of a disk can be increased by decreasing the spacing between altered segments on the same data track, and by decreasing the spacing between adjacent data tracks. It happens, however, that when the spacing between tracks is decreased to increase the storage capacity of the disk, the resolution of the main sensor of a data read head may be insufficient to read data only in the track of interest. In such a case, the main sensor of a data read head may undesirably read information contained in tracks that are adjacent to the track of interest.

In other words, the readback signals from data read heads, which are intended to be representative only of data stored in a particular track, may undesirably contain information stored on adjacent tracks. Essentially, data stored on the tracks that are immediately adjacent to the track of interest interfere with the data read signal from the track of interest. Such track-to-track interference is referred to as cross-talk.

Not surprisingly, devices have been introduced for cancelling cross-talk in readback signals. For example, U.S. Pat. No. 5,181,161 to Hirose et al. effects cross-talk cancellation by reading data on three adjacent tracks with two side sensors and one center sensor. Then, the signals from the two side sensors are modified and subtracted from the center sensor signal. In devices such as that disclosed in Hirose et al., the side sensor signals are typically modified by aligning the signals in time, equalizing the signals, and adjusting the gain of the signals.

Aligning the signals in time is required because the positioning of the center sensor relative to the side sensors may be such that the center sensor detects side track cross-talk data at some time before or after the side sensors detect the same dam. For this reason, prior to subtracting the side sensor signals from the center sensor signal, the signals must be aligned in time.

Signal equalization in some systems, and particularly in magnetic disk systems, is required because the sensors in such systems typically have a frequency response to off-track signals that is different from their frequency response to on-track signals. More specifically, the center sensor in such systems has a frequency response when reading data on the center track that is different from its frequency response to data on the side tracks. Likewise, the side sensors of such systems have frequency responses when reading data on their respective side tracks that is different from their frequency response to data on the center track. Consequently, in systems which employ sensors the frequency response of which varies depending on whether the data being read is on-track or off-track, the side sensor signals must be equalized. In other words, in many systems, prior to subtracting the side sensor signals from the center sensor signal, the side sensor signals must be modified to account for the different frequency response of the sensors to off-track signals.

Once alignment and equalization have been accomplished, the amplitude of the signals from the side sensors must be reduced in proportion to the contribution of data from the side tracks to the center sensor signal. Stated differently, side sensor signals that are representative of data on the side tracks are much stronger than the side track data contributions to the center sensor signal. Consequently, the aligned, equalized side sensor signals must be reduced in amplitude, and then subtracted from the center sensor signal, to thereby cancel unwanted cross-talk.

U.S. Pat. No. 5,166,914 to Shimada et al. and U.S. Pat. No. 5,181,161 to Hirose et al. are examples of apparatus directed to canceling cross-talk in optical disk systems, and both Shimada et al. and Hirose et al. borrow the signal processing considerations discussed above for magnetic disk systems. For example, Hirose et al. performs all three of the alignment, equalization, and gain adjustment steps discussed above, by using multi-tap transversal filters.

Taking Hirose et al. as an example, a transversal filter is allocated to each track, i.e., a center transversal filter is allocated to a center track and side transversal filters are allocated to respective side tracks. Alignment, equalization, and gain adjustment are performed by each transversal filter on its respective signal, prior to subtracting the side sensor signals from the main sensor signal.

The transversal filters of Hirose et al. function by solving equations that use upwards of ten coefficients which must be adjusted for, among other things, variations in disk linear velocity. Adapting the filter coefficients to variations in disk linear velocity is relatively time-consuming. Consequently, while Hirose et al. is effective for constant linear velocity applications, e.g., large block transfer or sequential access optical devices such as CDs or videodisks, its adaptive filter technique is too slow for random access optical disk data storage applications, in which the disk linear velocity can change rapidly.

We have discovered, however, that the frequency response of an optical read sensor to center track data is substantially the same as the sensor's frequency response to side track data, thereby obviating the need to equalize side sensor signals independently of the center sensor signal.

Accordingly, it is an object of the present invention to provide a cross-talk canceler for use in random access optical disk data storage systems. Another object of the present invention is to provide a cross-talk canceler, for use in optical disk systems, that does not require the use of transversal filtering techniques. Yet another object of the present invention is to provide a cross-talk canceler for use in optical disk systems that is easy to use and cost-effective.

SUMMARY OF THE INVENTION

An apparatus is disclosed for use with an optical data storage system to generate a data signal which is representative of a center data track of the data storage system. As intended by the present invention, the optical data storage system includes a data storage medium, with the data storage medium containing at least one inner data track, one outer data track, and the center data track therebetween. Also, the optical data storage system includes a light source for emitting at least one, and preferably inner, outer, and center, light beams respectively toward the inner, outer, and center tracks, and respective inner, outer, and center light sensors for receiving reflections of the beams and generating respective inner, outer, and center signals in response thereto.

In accordance with the present invention, the apparatus includes a signal conditioner for receiving the inner, outer, and center signals of the optical data storage system. The signal conditioner includes a skew compensator for removing time skew between the signals. Also, the signal conditioner includes a gain controller for adjusting the amplitudes of the inner and outer signals in proportion to predetermined contributions to the amplitude of the center signal caused by reflection of the center beam from the inner and outer tracks, respectively.

A signal subtractor receives the inner, outer, and center signals from the signal conditioner and subtracts the inner and outer signals from the center signal to generate an output signal. This output signal is sent to an equalizer which equalizes the output signal to generate the data signal.

In the presently preferred embodiment, inner, outer, and center analog-to-digital (AD) converters respectively digitize the inner, outer, and center signals and send the digitized signals to the skew compensator. Preferably, the skew compensator includes inner, outer, and center data buffers for respectively receiving the digitized inner, outer, and center signals. Additionally, the skew compensator accesses an associated sampling clock for establishing a frequency for generating the outputs of the AD converters. As intended by the present invention, the lengths of the data buffers are established such that the leading edge of the center signal exits the center buffer at substantially the same time as the leading edges of the inner and outer signals exit the inner and outer buffers, respectively.

Moreover, the skew compensator includes a free tuner for further eliminating temporal differences between the inner, outer, and center signals. In one embodiment, the inner, outer, and center signals are simultaneously sent to the skew compensator, and the fine tuner selectively adjusts the frequency of generating the outputs of the AD converters. In another embodiment, the time period between samples is a constant period, and the fine tuner establishes respective digitizing times at which the AD converters digitize the inner, outer, and center signals. In still another embodiment, the time period between samples is a constant period, and the temporal difference between the signals as they exit the respective buffers is interpolatively determined by the free tuner.

In another aspect of the present invention, an apparatus is disclosed for cancelling side data track contributions to an optical signal from a main data track, wherein each side track borders the main track and generates a respective side track optical signal. The apparatus includes respective sensors, each of which is associated with a respective optical signal for generating respective electrical main data track and electrical side data track signals representative of the associated optical signals.

A skew compensator receives the electrical data track signals and aligns the signals in time, and a gain controller adjusts the amplitudes of the electrical side data track signals in proportion to predetermined side data track contributions to the main data track signal. Further, a subtractor subtracts the electrical side data track signals from the electrical main data track signal and generates an output signal representative thereof. An equalizer then receives the output signal from the subtractor and modifies the output signal in accordance with the frequency of the output signal.

In yet another aspect of the present invention, a method is disclosed for removing components of a main data track signal in an optical data storage device which are arributable to cross-talk signals from side data tracks that border the main data track. The method includes the steps of receiving optical signals from the main data track and the side data tracks with respective sensors, and then generating respective electrical main data track and electrical side data track signals which are representative of the associated optical signals. The electrical data track signals are received and aligned in time, and the amplitudes of the electrical side data track signals are adjusted in proportion to predetermined cross-talk contributions to the main data track signal. Next, the electrical side data track signals are subtracted from the electrical main data track signal, and an output signal representative of the difference is generated. The output signal is received and modified in proportion to the frequency response of the sensor and associated optics.

In still another aspect of the present invention, an optical data storage system includes an optical data storage medium containing at least one inner data track, one outer data track, and a center data track therebetween. The system also includes a light source for emitting inner, outer, and center light beams respectively toward the inner, outer, and center tracks, and respective inner, outer, and center light sensors for receiving reflections of the beams and generating respective inner, outer, and center signals in response thereto.

A signal conditioner is also provided for receiving the inner, outer, and center signals, and the signal conditioner includes a skew compensator for removing time skew between the signals. Further, the signal conditioner includes a gain controller for adjusting the amplitudes of the inner and outer signals in proportion to predetermined contributions to the amplitude of the center signal caused by reflection of the center beam from the inner and outer tracks, respectively.

A signal subtractor receives the inner, outer, and center signals from the signal conditioner and subtracts the inner and outer signals from the center signal to generate an output signal. Then, an equalizer receives the output signal from the signal subtractor and equalizes the output signal to generate the data signal.

The details of the present invention, both as to its construction and operation, can best be understood in reference to the accompanying drawings, in which like reference numerals refer to like parts, and in which:

DESCRIPTION OF THE PREFERRED EMBODIMENT

Figure 1:
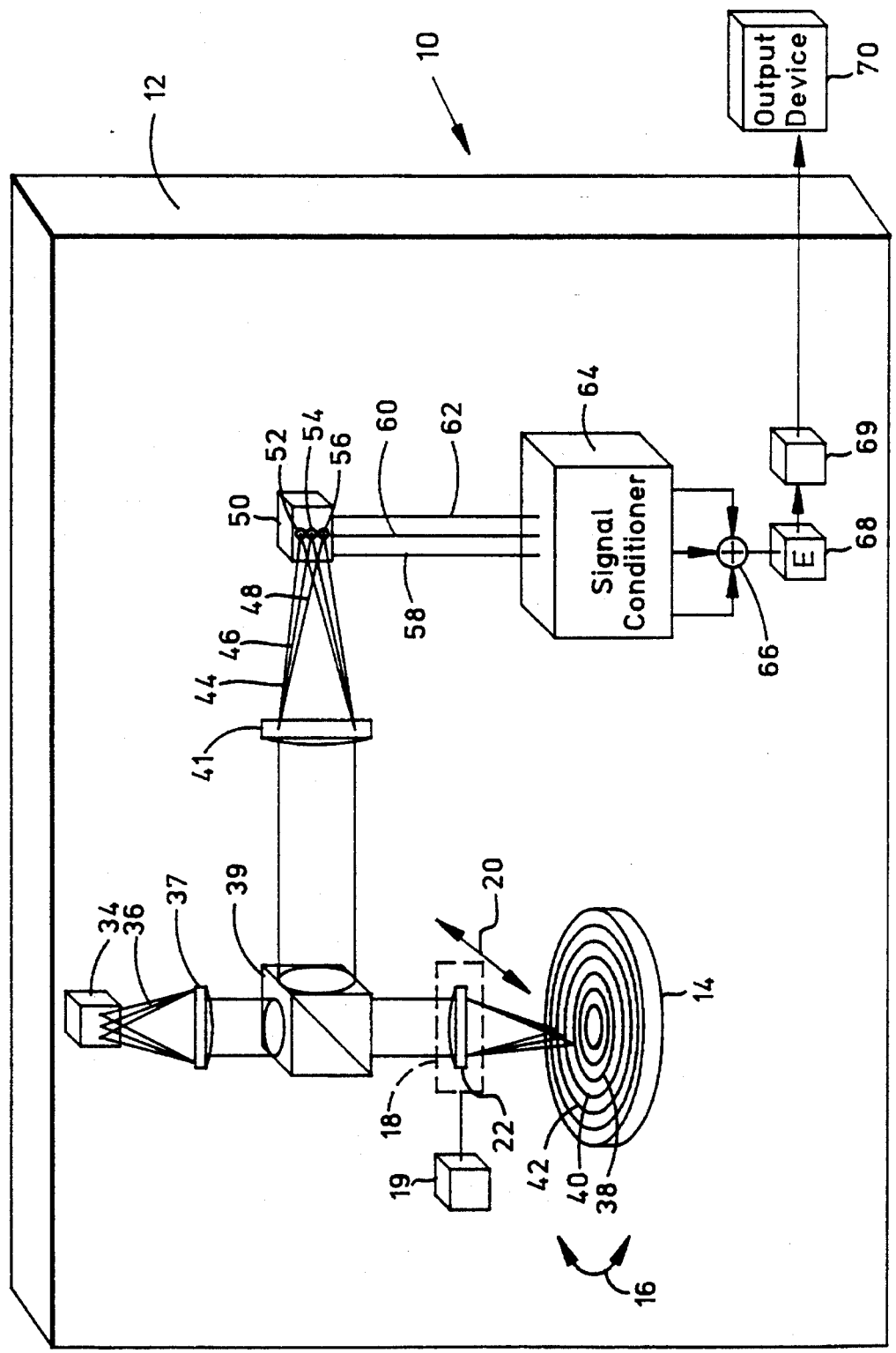
FIG. 1 is a schematic view of the optical data storage system of the present invention.

Referring initially to FIG. 1, an optical data storage system is shown, generally designated 10. As shown, the system 10 includes an optical data storage device 12, and an optical data storage disk 14 can be rotatably engaged with the device 12 for rotation in the directions indicated by the arrow 16. It is to be understood that the optical disk 14 can be any well-known optical storage device, e.g., a magneto-optical disk, compact optical disk (CD), so-called phase-change optical disk, or a write-once read-many optical disk. Accordingly, the optical disk 14 can be rotated to retrieve data from the disk 14.

FIG. 1 shows that an optical actuator 18 is reciprocally mounted on the device 12 for motion along a predetermined radius of the optical disk 14 as indicated by the arrow 20. Thus, the optical actuator 18 can selectively be positioned above an area of the optical disk 14 that holds data to be retrieved. In accordance with principles well-known in the art, the radial position of the optical actuator 18 vis-a-vis the disk 14 is established by an optical actuator controller 19.

In one intended embodiment, the optical actuator 18 can be any suitable optical head known in the art which includes an objective lens 22. In accordance with principles well-known in the art, a laser light source 34 is mounted within the device 12, and the laser light source 34 directs at least three beams 36 of laser light toward the optical actuator 18 through a collimating tern 37 and a beam splitter 39. In ram, the objective lens 22 directs the beams 36 onto respective inner, center, and outer data tracks 38, 40, 42 of the optical disk 14.

Based upon the characteristics of the data tracks 38, 40, 42, which are representative of the data stored thereon, the tracks 38, 40, 42 reflect the laser beams back through the objective lens 22 to the beam splitter 39. The beam splitter 39 is any suitable beam splitting device known in the art which redirects the reflected laser beams, preferably toward a return focussing lens 41. In turn, the return focussing lens 41 refracts the reflected laser light into inner, center, and outer return beams 44, 46, 48 which are respectively representative of the data that is stored on the data tracks 38, 40, 42. The return beams 44, 46, 48 are directed toward a reader 50 that includes respective inner, center, and outer light sensors 52, 54, 56. As intended by the present invention, the reader 50 can be any suitable optical reader well-known in the art.

Figure 2:
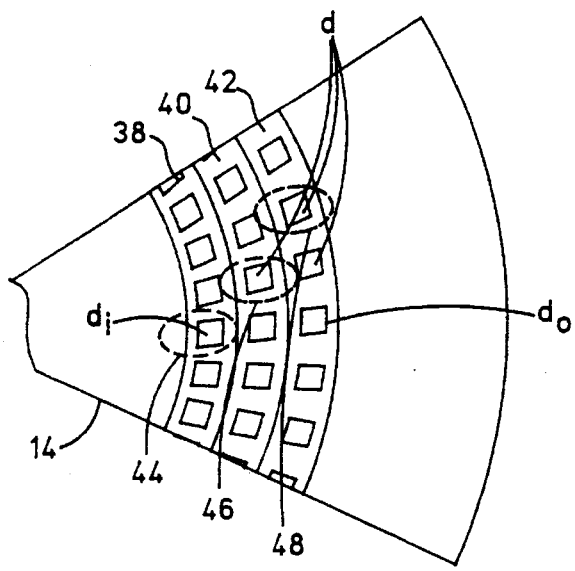
FIG. 2 is a schematic diagram of the optical disk and readback optical beams of the present invention.

Referring briefly to FIG. 2, each return beam 44, 46, 48 is respectively represented by a phantom oval, and the size of the oval represents the resolution of the read sensors 52, 54, 56. The beams 44, 46, 48 are reflected from the optical disk 14 based upon the characteristics of the data elements "d" stored on the tracks 38, 40, 42. As shown in FIG. 2, the beams 44, 46, 48 are not radially aligned with each other with respect to the disk 14.

As further shown in FIG. 2, the resolution of the center read sensor 54 and center beam 46 is such that the center return beam 46 is affected both by data within the center track 40, as well as data within the inner and outer tracks 38, 42. It is the purpose of the present invention to remove the influence of such cross-talk from the output data signal of the system 10, thereby producing a dam signal which virtually exclusively represents data elements "d" stored on the center track 40.

It can be appreciated in reference to FIG. 2 that the center return beam 46 is affected by (i.e., reads) a particular data element $d_i$ in the inner data track 38 at some time subsequent to when the data element $d_i$ is read by the inner return beam 44, primarily because the inner and center beams 44, 46 are not radially aligned with respect to the disk 14. Likewise, the center return beam 46 is affected by (i.e., reads) a particular data element $d_o$ in the outer data track 42 at some time prior to when the data element $d_o$ is read by the outer return beam 48. Consequently, to use the signals carried by the inner and outer return beams 44, 48 to cancel the contributions of the data elements $d_i$, $d_o$ to the center return beam 46, the signals must be aligned in time, in accordance with the disclosure below.

Referring back to FIG. 1, the sensors 52, 54, 56 receive the return beams 44, 46, 48 and generate respective inner, center, and outer electrical signals (represented in FIG. 1 by the lines 58, 60, 62) that are representative of the return beams 44, 46, 48. Then, the electrical signals 58, 60, 62 are sent to a signal conditioner 64. In accordance with the disclosure below, the signal conditioner 64 aligns the electrical signals 58, 60, 62 in time and adjusts the gain of the inner and outer electrical signals 58, 62 as appropriate to cancel the contributions to the center electrical signal 60 of data elements within the inner and outer tracks 38, 42.

Next, the conditioned signals 58, 60, 62 are sent to an adder 66. The adder 66 is any suitable, device well-known in the art which subtracts the conditioned inner and outer signals 58, 62 from the center signal 60 and generates an output signal representative virtually exclusively of data within the center track 40. Stated differently, the adder 66 negates the conditioned inner and outer signals 58, 62 and then adds them to the center signal 60.

As shown in FIG. 1, the output signal of the adder 66 is sent to an equalizing circuit 68. Preferably, the equalizing circuit 68 is any well-known equalizing device, e.g., a transversal filter, that adjusts the gain of the output signal from the adder as appropriate for the particular frequency response of the system 10.

The equalized signal from the equalizing circuit 68 is then sent to a processing circuit 69 for further standard signal processing. For example, the processing circuit 69, among other things, translates the digital signal from the equalizing circuit 68 to equivalent binary code. Also, the processing circuit 69 includes circuitry for edge/peak detection and error detection. From the processing circuit 69, the signal is sent to an appropriate output device 70. As the skilled artisan will appreciate, the output device 70 is any suitable device, e.g., an IBM personal computer or main frame computer, or the electronics of a CD player, which uses the data from the center track 40 as represented by the signal from the equalizing circuit 68.

Figure 3:
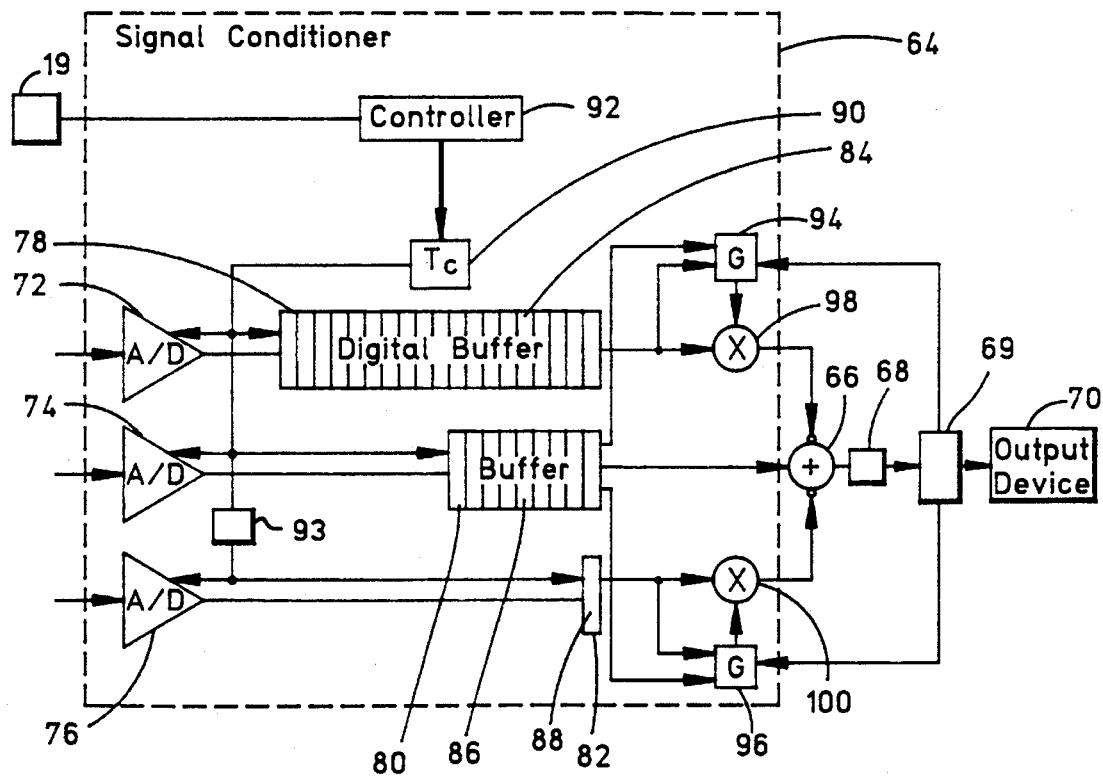
FIG. 3 is a block diagram of the signal conditioning circuitry of the optical data storage system of the present invention.

Now referring to FIG. 3, the details of the signal conditioner 64 can be seen. In the preferred embodiment shown in FIG. 3, the signal conditioner 64 includes inner, center, and outer analog-to-digital (AD) converters 72, 74, 76 for simultaneously digitizing the signals from the inner, center, and outer read sensors 52, 54, 56, respectively. It is to be understood, however, that the present invention contemplates analog embodiments as well as digital embodiments. The AD converters 72, 74, 76 output a respective digitized signal to inner, center, and outer first in-first out (FIFO) digital buffers 78, 80, 82.

As intended by the present invention, the buffers 78, 80, 82 function as a coarse alignment device to align the signals from the AD converters 72, 74, 76 in time. Stated differently, the buffers 78, 80, 82 establish a skew compensator to remove time skew between corresponding signals from the AD converters 72, 74, 76. Such a step is necessary when the beams 44, 46, 48 (FIG. 2) are not radially aligned with respect to the disk 14. Skew compensation may not be necessary in systems wherein the optical beams are radially aligned with respect to the disk of the system.

In the presently preferred embodiment, each digital buffer 78, 80, 82 contains at least one respective register 84, 86, 88. Digitized data entering each buffer 78, 80, 82 moves sequentially through the registers of the buffer, and the time period between register shifts is the sampling period at which the AD converters 72, 74, 76 sample the signal from their respective read sensors 52, 54, 56. This sampling period is established by a channel clock 90 that is advantageously associated with a crystal oscillator clock by means well-known in the art.

In accordance with the present invention, the lengths of the buffers 78, 80, 82 (i.e., the number of registers 84, 86, 88 within each buffer 78, 80, 82) are established such that the leading edge of the signal from the center AD converter 74 exits the center buffer 80 in the same sampling period during which the leading edges of the corresponding signals from the inner and outer AD converters 72, 76 exit the inner and outer buffers 78, 82. In other words, the lengths of the buffers 78, 80, 82 are established to remove the time skew between the signals from the AD converters 72, 74, 76 which is primarily attributable to the distance between adjacent return beams 44, 46, 48. Although the number of buffer registers can vary, in the presently preferred embodiment the inner buffer 78 contains about one hundred forty (140) registers 84, the center buffer 80 contains about seventy (70) registers 86, and the outer buffer 82 contains between one and three (1–3) registers 88 (only one register 88 shown in FIG. 3).

The difference in the number of buffer registers between two adjacent buffers 78, 80, 82 must be proportional to the distance between adjacent beams 44, 46, 48, the maximum linear data density on the disk 14, and the amount of oversampling required to ensure that data is adequately read. Typically, the rate of sampling is about one and two-tenths (1.2) times the data clock rate. The clock controller 92 measures the time delay between adjacent track signals as the linear velocity varies from track to track or even within a single revolution of the disk 14 and then ensures that the number of samples taken during the delay period equals the difference in the number of registers between adjacent buffers 78, 80, 82.

As recognized by the present invention and shown in FIG. 3, a time delay generator 93 may be inserted into the clock signal line to buffer 82 and AD converter 76 to allow for the possibility that the distance between the outer beam 48 and center beam 46 may be slightly different than the distance between the inner beam 44 and center beam 46. More specifically, when the distance between the outer beam 48 and center beam 46 is different from the distance between the inner beam 44 and center beam 46, the clock controller 92 cannot generally establish a clock 90 rate which is simultaneously correct both for the difference in the number of outer and center registers 88, 86 and the difference in the number of inner and center registers 84, 86. With the time delay generator 93 (which also has an input from the clock controller 92) and registers 88, the signal from the outer AD converter 76 can be advanced or delayed, as appropriate for the particular difference in interbeam distances. As the skilled artisan will appreciate, additional delays may be inserted into the outer data path or into the center and inner data paths to appropriately synchronize the signals before combining them at adder 66. These additional delays are not shown in FIG. 3.

Thus, as can be appreciated in reference to FIG. 3, the clock 90, which is controlled by a controller 92, adjusts the sampling frequencies of the AD converters 72, 74, 76 to cancel small time differences in corresponding signals from the AD converters 72, 74, 76. Such small time differences are attributable to variations in the linear velocity of the tracks 38, 40, 42. In other words, the leading edge of the signal from the center AD converter 74 exits the center buffer 80 at the same time as the leading edges of the corresponding signals from the inner and outer AD converters 72, 76 exit the inner and outer buffers 78, 82, respectively.

In the presently preferred embodiment, the clock 90 is a voltage controlled oscillator (VCO) and the output signal of the controller 92 determines the period of the clock 90. The voltage input to the VCO is established to be proportional to the radial position of the optical actuator 18 vis-a-vis the disk 14, available from the read head controller 19, and to the rotational speed of the disk 14, which is readily available from the system 10. As is well known in the art, the radius of a particular data track and the rotational speed of the disk 14 can be correlated to a linear velocity of the particular track. Consequently, in the presently preferred embodiment, the output signal of the controller 92 (and thus the sampling period established by the clock 90) is proportional to the linear velocity of the center data track 40.

Further, the present invention recognizes that the linear velocity of the center data track 40 may not be exactly constant. Accordingly, the linear velocity of the center data track 40 can periodically be determined and input to the clock controller 92. In one presently preferred embodiment, one or more predetermined areas of the disk 14 can be marked with timing symbols, and the timing symbols read by the optical actuator 18 for determining the actual linear velocity of the center data track 40 in accordance with well-known principles.

Still referring to FIG. 3, the output signals of the inner and outer buffers 78, 82 are respectively sent to inner and outer gain determiners 94, 96, and to respective inner and outer signal multipliers 98, 100. The output signals from the gain determiners 94, 96 are also sent to the signal multipliers 98, 100. In turn, the output signals from the signal multipliers 98, 100 and the center buffer 80 are sent to the adder 66.

As intended by the present invention, the function of the gain determiners 94, 96, and associated signal multipliers 98, 100, which together establish respective gain controllers, is to adjust the amplitude of the output signals from the inner and outer buffers 78, 82 in proportion to the contribution of the inner and outer tracks 38, 42 to the center return beam 46. The adder 66 then subtracts the output signals of the multipliers 98, 100 from the output signal of the center buffer 80. Consequently, the output signal of the adder 66 is representative almost exclusively of data contained within the center data track 40.

In one presently preferred embodiment the gain settings of the gain determiners 94, 96 are established by individually reading the inner, center, and outer beams 44, 46, 48 at locations on the disk 14 where adjacent tracks contain no data. For example, a predetermined location on the disk 14 is selected to contain data only in the inner track 38, and not in the center and outer tracks 40, 42, or in the track immediately inward of the inner track 38. Then, the inner and center return beams 44, 46 are read. In such a configuration, the only contribution to the center return beam 46 will be from data elements $d_i$ in the inner data track 38. Also, the only contribution to the inner return beam 44 will be from data elements $d_i$ in the inner data track 38. Thus, the ratio of the amplitudes of the signals from the center beam 46 and the inner return beam 44 can be determined by appropriately dividing the amplitudes. This ratio is sent to the inner multiplier 98, and the signal from the inner buffer 78 is multiplied by the ratio and sent to the adder 66.

In addition, it may be desirable to establish test locations wherein a predetermined location on the disk 14 is selected to contain data in both the inner track 38 and center track 40, but not in the outer tracks 42 or in the track immediately inward of the inner track 38. Then, an average or weighted average gain setting can be determined from the two test locations.

It is to be understood that the above steps are also performed with regard to the outer data track 42. If desired, a plurality of predetermined locations on the disk 14 can contain data as described above for updating the gain settings of the determiners 94, 96, with the areas of the disk 14 to be erased of data being determined, e.g., by the particular track's revolution number, modulo 3.

Further, as can be seen in reference to FIG. 3, the settings of the gain determiners 94, 96 can be further adjusted by feedback control means. More particularly, both the signal from the center buffer 80 and the signal from the processing circuit 69 can be input to the determiners 94, 96, and the determiners 94, 96 in turn compare the two signals to generate an error signal. Based upon the generated error signal, the settings of the determiners 94, 96 can be further adjusted. If desired, a feedback signal from the processing circuit 69 can also be input to the clock controller 92.

It is to be further understood that because the skew adjustment and gain adjustment steps discussed above are independent of each other, they may be performed in the order described, or gain adjustment may precede skew adjustment and even precede signal digitization.

Figure 4:
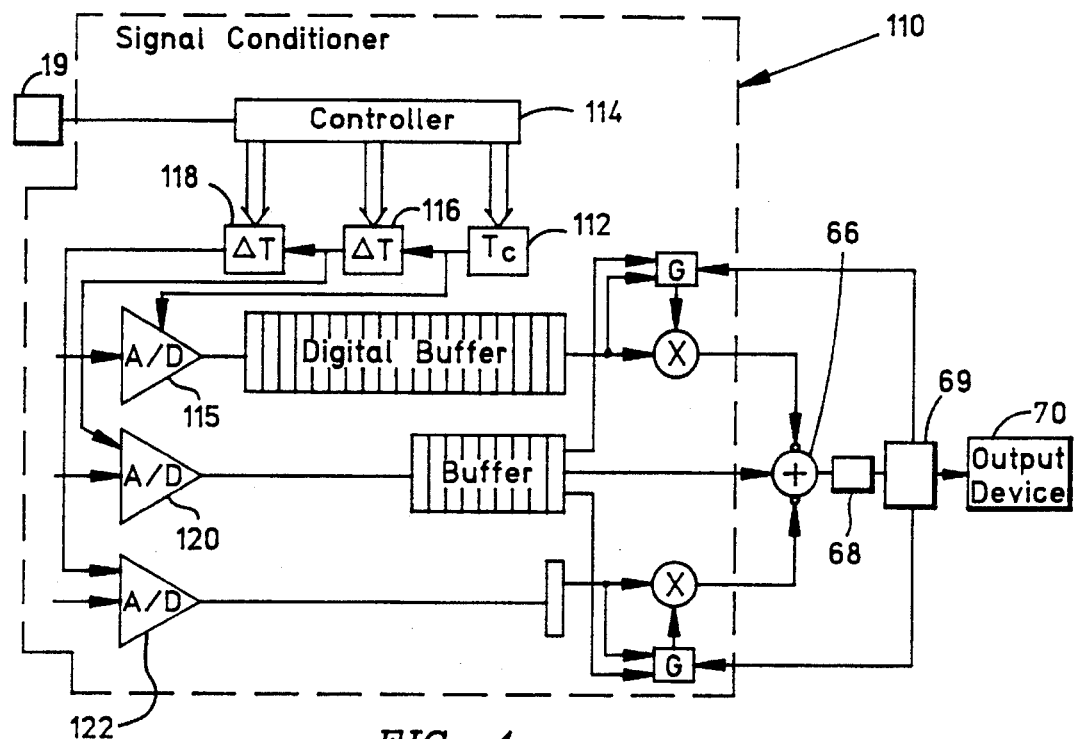
FIG. 4 is a block diagram of an alternate embodiment of the signal conditioning circuitry of the optical data storage system of the present invention.

FIG. 4 shows an alternative embodiment of the signal conditioner of the present invention, generally designated 110. With the exceptions noted below, the signal conditioner 110 shown in FIG. 4 is substantially identical to the signal conditioner 64 shown in FIG. 3, except that the signal conditioner 110 uses a skew adjustment mechanism that is different from the skew adjustment mechanism discussed above.

As shown in FIG. 4, the signal conditioner 110 includes a clock 112 and a clock controller 114. The signal from the clock 112 is sent to an inner AD converter 115 to establish a sampling time during which the inner AD converter 115 samples, i.e., digitizes, the signal from the inner read sensor 52. Also, a center and outer clock time delay generator 116, 118 are provided, and in one embodiment each time delay generator 116, 118 is a monostable multivibrator.

FIG. 4 shows that the center time delay generator 116 receives the output signal from the clock 112 and from the controller 114. In accordance with the present invention, the center time delay generator 116 delays the signal from the clock 112 and sends an output clocking signal to a center AD converter 120 to establish a sampling time during which the center AD converter 120 samples, i.e., digitizes, the signal from the center read sensor 54.

Likewise, the outer time delay generator 118 receives the output signal from the center time delay generator 116 and from the controller 114. In accordance with the present invention, the outer time delay generator 118 delays the signal from the center time delay generator 116 and sends an output clocking signal to an outer AD converter 122 to establish a sampling time during which the outer AD converter 122 samples, i.e., digitizes, the signal from the outer read sensor 56. To account for differences in interbeam distances, the outer time delay generator 118 can impose a time delay that is different from the time delay imposed by the center time delay generator 116. Also, the clock 112 can also receive an input from the controller 114.

As can be understood in reference to FIG. 4, the amounts by which the time delay generators 116, 118 delay their respective input timing signals are established by the controller 114. As disclosed above, the controller 114 receives a signal from the read head controller 19 which is representative of the radial position of the optical actuator 18. Consequently, the delay time output by the controller 114 (and, hence, the sampling times established by the time delay generators 116, 118) is inversely proportional to the linear velocity of the center data track 40. In other words, the time skew adjustment of the signal conditioner 110 shown in FIG. 4 causes the AD converters 115, 120, 122 to sample their respective input signals at times that are staggered as appropriate to account for the actual linear velocity of the center data track 40 and the particular separations between the beams 44, 46, 48.

Figure 5:
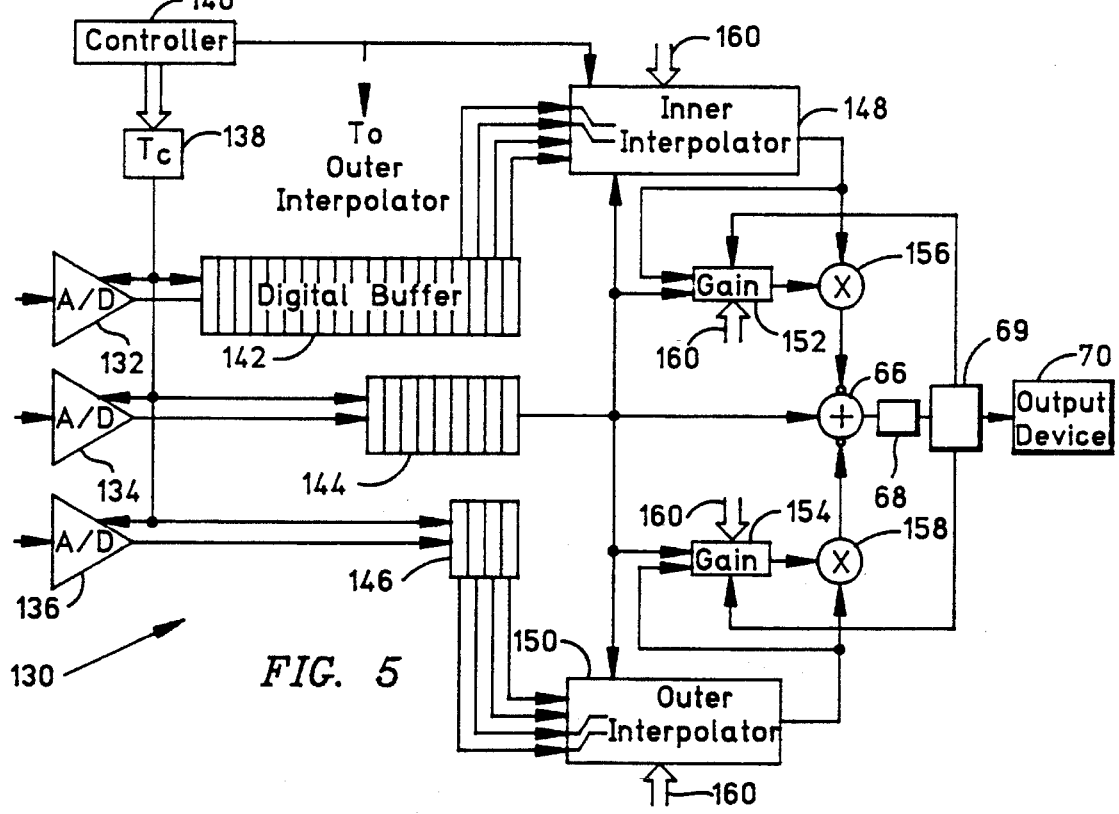
FIG. 5 is a block diagram of another alternate embodiment of the signal conditioning circuitry of the optical data storage system of the present invention.

FIG. 5 shows yet another means for effecting a time skew adjustment in a signal conditioner, generally designated 130. As intended by the present invention, the time skew adjustment mechanism shown in FIG. 5 adjusts for small time skew differences between signals representative of the inner, center, and outer data tracks 38, 40, 42 by interpolation.

More specifically, the signal conditioner 130 includes inner, center, and outer AD converters 132, 134, 136 which sample the signals from their respective light sensors simultaneously per a sample periodicity established by a clock 138. The period for sampling established by the clock 138 is in turn established by a clock controller 140. Each of the AD converters 132, 134, 136 sends its digitized output signal to a respective inner, center, and outer data buffer 142, 144, 146. The AD converters 132, 134, 136 and buffers 142, 144, 146 shown in FIG. 5 function substantially identically to the AD converters 72, 74, 76 and buffers 78, 80, 82 shown in FIG. 3.

As shown in FIG. 5, however, the output signals of the inner and outer buffers 142, 146 are respectively sent to inner and outer interpolators 148, 150. More particularly, the data contained in the last two to six registers in the inner and outer buffers 142, 146, and preferably the data contained in the last four registers in the inner and outer buffers 142, 146, as shown, are sent to the inner and outer interpolators 148, 150.

Each interpolator 148, 150 receives the output signal from the center buffer 144 and from the clock controller 140. Further, the output signals from the center buffer 144 and from the interpolators 148, 150 are sent to respective inner and outer gain determiners 152, 154. Additionally, the output signals from the interpolators 148, 150 and the gain determiners 152, 154 are sent to respective gain multipliers 156, 158. Moreover, the output signals from the gain multipliers 156, 158 and the center buffer 144 are sent to the adder 66 and from thence to the equalizing circuit 68 for processing as described above. Finally, the double arrows 160 indicate the inputting of feedback signals from the processing circuit 69 (FIG. 1) to the interpolators 148, 150 and gain determiners 152, 154.

With the above-described circuit arrangement, the operation of the signal conditioner 130 can be understood, taking the operation of the inner interpolator 148 as an example. It is to be understood that the operation of the outer interpolator 150 is in all essential respects identical to the operation of the inner interpolator 148.

As intended by the present invention, the inner interpolator 148 determines which of the last four or so registers of the inner data buffer 142 contain inner track 38 data that corresponds to the data in the last register of the center buffer 144. Ordinarily, one of the registers of the inner buffer 142 will contain data from the inner track 38 that has been detected by the inner read sensor 52 just prior to the cross-talk detection of the same inner track 38 data by the center read sensor 54. Also, one of the registers of the inner buffer 142 will contain data from the inner track 38 that has been detected by the inner read sensor 52 just after the cross-talk detection of the same inner track 38 data by the center read sensor 54.

To make this determination, the inner interpolator 148 directly measures the time skew (to the nearest clock cycle) between corresponding signals in the inner buffer 142 and center buffer 144 by counting the number of clock cycles between signals generated by a known test mark on the optical disk. Accordingly, this first determination by the inner interpolator 148 is an integer value. Then, the inner interpolator 148 estimates the fractional time delay (i.e., the fraction of a clock cycle) between corresponding signals in the inner buffer 142 and center buffer 144. This estimation is made by standard signal processing means.

It is to be understood that the determination of which registers of the inner data buffer 142 contain inner track 38 data corresponding to data in the last register of the center buffer 144, as well as the determination of the fractional time delay between corresponding signals in the inner buffer 142 and center buffer 144, can alternatively be provided to interpolator 148 by a controller (not shown) that would have access to the timing information contained in tracks 38, 40. This controller can use the timing information before it is digitized by AD converters 132, 134 and can use standard analog means, e.g., a charge pump, to determine the fractional time delay.

The output signal of the inner interpolator 148 is sent to the gain determiner 152 and multiplier 156. The gain determiner 152 and associated multiplier 156 function substantially identically to the determiner 94 and multiplier 98 shown in FIG. 3 to adjust the amplitude of the output signal from the inner interpolator 148 in proportion to the contribution of the inner tracks 38 to the center return beam 46.

While the particular apparatus and method for cancelling cross-talk in signals from optical data storage systems as herein shown and described in detail is fully capable of achieving the above-stated objects of the invention, it is to be understood that it is illustrative of but one preferred embodiment, that other embodiments may exist that will be obvious to those skilled in the art, and that the scope of the present invention accordingly is to be limited by nothing other than the appended claims.

We claim:

1. In an optical data storage system having a data storage medium containing at least one inner data track, one outer data track, and a center data track therebetween, a light source for emitting at least one light beam toward the inner, outer, and center tracks, and respective inner, outer, and center light sensors for receiving reflections of the beam and generating respective inner, outer, and center readback signals in response thereto, an apparatus for generating a data signal representative of data in the center data track, comprising:

a signal conditioner for receiving the inner, outer, and center readback signals, the signal conditioner including a skew compensator for removing time skew between the signals, the, signal conditioner also including a gain controller for adjusting the amplitudes of the inner and outer signals in proportion to predetermined contributions to the amplitude of the center signal caused by reflection of the beam from the inner and outer tracks, respectively;

a signal adder for receiving the inner, outer, and center readback signals from the signal conditioner and subtracting the inner and outer readback signals from the center readback signal to generate an output signal; and an equalizer for receiving the output signal from the signal adder and equalizing the output signal to generate the data signal.

2. The apparatus of claim 1, wherein the light beam includes inner, outer, and center beams respectively directed at the inner, outer, and center data tracks, and the apparatus further comprises inner, outer, and center analog-to-digital (AD) converters for respectively digitizing the inner, outer, and center readback signals and for sending the digitized signals to the skew compensator.

3. The apparatus of claim 2, wherein the skew compensator includes:

inner, outer, and center data buffers for respectively receiving the digitized inner, outer, and center readback signals; and a sampling clock for establishing a frequency for sampling the outputs of the AD converters, such that
      the lengths of the data buffers are such that a leading edge of the center readback signal exits the center buffer at substantially the same time as leading edges of the inner and outer readback signals exit the inner and outer buffers, respectively.

4. The apparatus of claim 3, wherein the skew compensator further comprises a fine tuner for eliminating temporal differences between the inner, outer, and center readback signals.

5. The apparatus of claim 4, wherein the inner, outer, and center readback signals are simultaneously sent to the skew compensator, and the free tuner selectively adjusts the frequency for sampling the outputs of the AD converters.

6. The apparatus of claim 4, wherein the frequency for sampling has a constant period, and the free tuner establishes respective digitizing times at which the AD converters digitize the inner, outer, and center readback signals.

7. The apparatus of claim 4, wherein the frequency for sampling has a constant period, and the temporal difference between the signals as they exit the respective buffers is interpolatively determined by the fine tuner.

8. A device for cancelling side data track contributions to an optical signal from a main data track, wherein each side track borders the main track and generates a respective side track optical signal, comprising:

a respective sensor associated with each optical signal for generating respective electrical main data track and electrical side data track signals representative of the associated optical signals;

a skew compensator for receiving the electrical data track signals and aligning the signals in time;

a gain controller for adjusting the amplitudes of the electrical side data track signals in proportion to predetermined side data track contributions to the main data track signal;

an adder for subtracting the electrical side data track signals from the electrical main data track signal and generating an output signal representative thereof; and an equalizer for receiving the output signal from the adder and modifying the output signal in accordance with the frequency of the output signal.

9. The device of claim 8, further comprising:

a respective analog-to-digital (AD) converter associated with each electrical signal responsive to the side data track signals and to the main data track signal for providing digitized inner, outer, and center signals, and the skew compensator includes:

inner, outer, and center data buffers for respectively receiving the digitized inner, outer, and center signals; and a sampling clock for establishing a frequency for sampling the outputs of the AD converters, wherein the lengths of the data buffers are established such that the leading edge of the center signal exits the center buffer at substantially the same time as the leading edges of the inner and outer signals exit the inner and outer buffers, respectively.

10. The device of claim 9, wherein the skew compensator further comprises a fine tuner for further eliminating temporal differences between the inner, outer, and center signals.

11. The device of claim 10, wherein the inner, outer, and center signals are simultaneously sent to the skew compensator, and the fine tuner selectively adjusts the frequency for sampling the outputs of the AD converters.

12. The device of claim 10, wherein the frequency for sampling has a constant period, and the free tuner establishes respective digitizing times at which the AD converters digitize the inner, outer, and center signals.

13. The device of claim 10, wherein the frequency for sampling has a constant period, and the temporal difference between the signals as they exit the respective buffers is interpolatively determined by the fine tuner.

14. For an optical data storage device, a method for removing components of a main data track signal attributable to cross-talk signals from side data tracks bordering the main data track, comprising the steps of:

(a) receiving optical signals from the main data track and the side data tracks with respective sensors;

(b) generating electrical data track signals including respective electrical main data track and electrical side data track signals representative of the associated optical signals;

(c) receiving the electrical data track signals and aligning the electrical data track signals in time;

(d) adjusting the amplitudes of the electrical side data track signals in proportion to predetermined cross-talk contributions to the main data track signal;

(e) subtracting the electrical side data track signals from the electrical main data track signal and generating an output signal representative thereof;

(f) receiving the output signal; and (g) modifying the output signal in accordance with the frequency of the output signal.

15. The method of claim 14, wherein step (c) includes sending the electrical data track signals to respective buffers and establishing the length of the buffers such that the leading edges of the electrical data track signals exit the respective buffers in substantially the same period.

16. The method of claim 15, further comprising the step of fine tuning the electrical data track signals by eliminating any remaining temporal differences between the electrical data track signals.

17. An optical data storage system, comprising:

an optical data storage medium containing at least one inner data track, one outer data track, and a center data track therebetween;

a light source for emitting inner, outer, and center light beams respectively toward the inner, outer, and center tracks;

respective inner, outer, and center light sensors for receiving reflections of the beams and generating respective inner, outer, and center signals in response thereto;

a signal conditioner for receiving the inner, outer, and center signals, the signal conditioner including a skew compensator for removing time skew between the signals, the signal conditioner also including a gain controller for adjusting the amplitudes of the inner and outer signals in proportion to predetermined contributions to the amplitude of the center signal caused by reflection of the center beam from the inner and outer tracks, respectively;

a signal adder for receiving the inner, outer, and center signals from the signal conditioner and subtracting the inner and outer signals from the center signal to generate an output signal; and an equalizer for receiving the output signal from the signal adder and equalizing the output signal to generate the data signal.

18. The system of claim 17, further comprising inner, outer, and center analog-to-digital (AD) converters for respectively digitizing the inner, outer, and center signals and for sending the digitized signals to the skew compensator.

19. The system of claim 18, wherein the skew compensator includes:

inner, outer, and center data buffers for respectively receiving the digitized inner, outer, and center signals; and a sampling clock for establishing a frequency for sampling the outputs of the AD converters, wherein
the lengths of the data buffers are established such that the leading edge of the center signal exits the center buffer at substantially the same time as the leading edges of the inner and outer signals exit the inner and outer buffers, respectively.

20. The system of claim 19, wherein the skew compensator further comprises a fine tuner for eliminating temporal differences between the inner, outer, and center signals.

21. The system of claim 20, wherein the inner, outer, and center signals are simultaneously sent to the skew compensator, and the fine tuner selectively adjusts the frequency for sampling the outputs of the AD converters.

22. The system of claim 20, wherein the frequency for sampling has a constant period, and the free tuner establishes respective digitizing times at which the AD converters digitize the inner, outer, and center signals.

23. The system of claim 20, wherein the frequency for sampling has a constant period, and the temporal difference between the signals as they exit the respective buffers is interpolatively determined by the fine tuner.

\* \* \* \* \*

UNITED STATES PATENT AND TRADEMARK OFFICE
CERTIFICATE OF CORRECTION

PATENT NO. : 5,483,515
DATED : January 9, 1996
INVENTOR(S) : Cheng et al

It is certified that error appears in the above-indentified patent and that said Letters Patent is hereby corrected as shown below:

Column 12, line 38, change "free" to --fine--.
           line 41, change "free" to --fine--.

Column 13, line 26, change "free" to --fine--.
Column 14, line 54, change "free" to --fine--.

Signed and Sealed this

Twenty-fifth Day of June, 1996

Attest:

BRUCE LEHMAN

Attesting Officer      Commissioner of Patents and Trademarks